July 30, 1957
F. W. SIDE
2,800,914
CONTROL APPARATUS
Filed Dec. 7, 1951
3 Sheets-Sheet 1
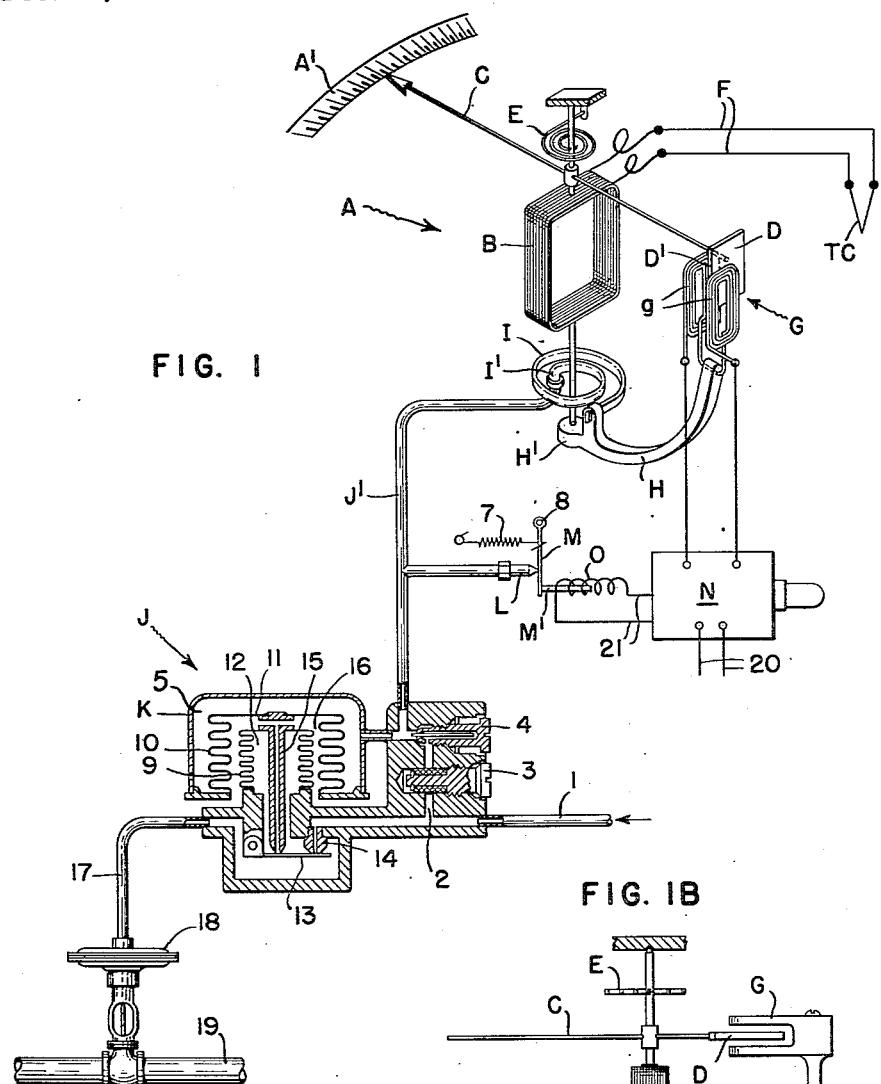
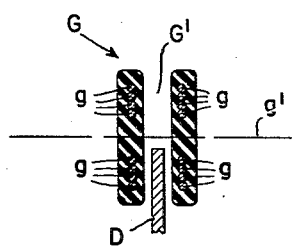
*INVENTOR.*
FREDERICK W. SIDE
BY *Arthur H. Swanson*
ATTORNEY.

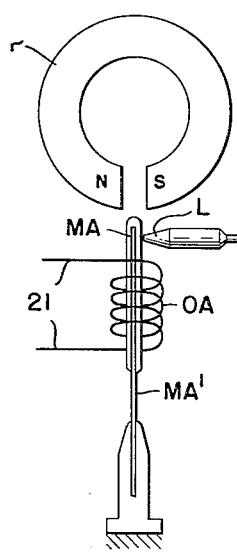
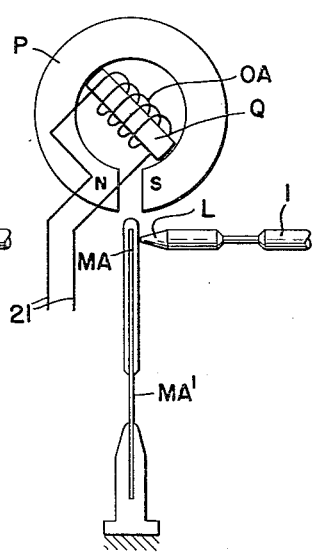
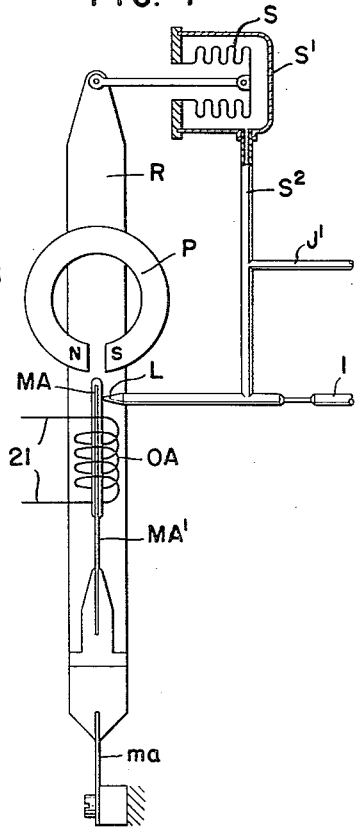
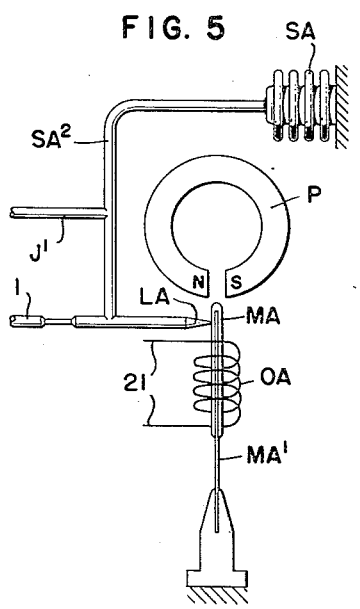
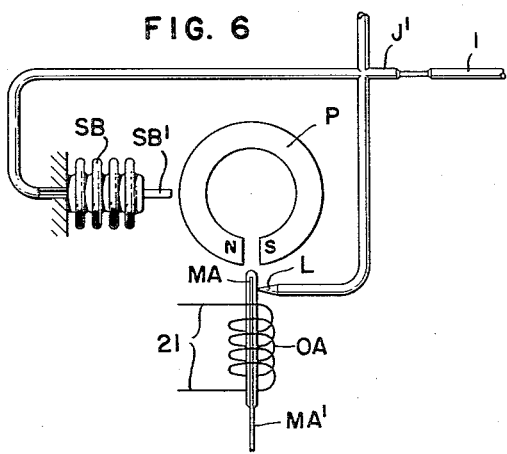

July 30, 1957 F. W. SIDE 2,800,914
CONTROL APPARATUS
Filed Dec. 7, 1951 3 Sheets-Sheet 3

*INVENTOR.*
FREDERICK W. SIDE
BY *Arthur H. Swanson*
ATTORNEY.

United States Patent Office 2,800,914
Patented July 30, 1957

2,800,914

CONTROL APPARATUS

Frederick W. Side, Philadelphia, Pa., assignor to Minneapolis-Honeywell Regulator Company, Minneapolis, Minn., a corporation of Delaware Application December 7, 1951, Serial No. 260,407

4 Claims. (Cl. 137—85)

The general object of the present invention is to provide improved air control apparatus. A primary object of the invention is to provide novel air control apparatus of a relatively simple and inexpensive character and adapted to effect control actions in accurate response to small changes in a control condition, which heretofore have been affected with equal accuracy only by the use of pneumatic control apparatus which is less simple and more expensive to construct.

A primary object of the present invention is to combine a sensitive deflecting measuring instrument such as a millivolt meter, with novel electro-magnetic means for regulating the bleed nozzle pressure of an air control system without subjecting the deflecting instrument to a loading force, and without giving rise to objectionable hunting actions. Another primary object of the invention is to provide means including an electronic oscillator and amplifier for producing a follower action on each change in the deflective position of the measuring instrument and for adjusting the bleed nozzle pressure of air control apparatus in linear accordance with each follower action.

A more specific object of the invention is to provide a follower mechanism which regulates the bleed nozzle pressure by adjusting a flapper valve, and which is characterized by the inclusion in said mechanism of a simple and effective form of an electronic oscillator and amplifier mechanism heretofore devised, and put into successful commercial use for other purposes.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a diagrammatic illustration of novel air control apparatus including electro-magnetic means for regulating an air pressure;

Fig. 1a is a plan section of an inductor shown diagrammatically in Fig. 1;

Fig. 1b illustrates a modification in the vane and inductor position shown in Fig. 1.

Fig. 2 illustrates one modification, and Fig. 3 illustrates a somewhat different modification of the electromagnetic means shown in Fig. 1 for regulating an air pressure;

Fig. 4 illustrates a modification in which the electromagnetic means shown in Fig. 1 for regulating an air pressure includes provisions for obtaining so-called space balance action;

Figure 7:
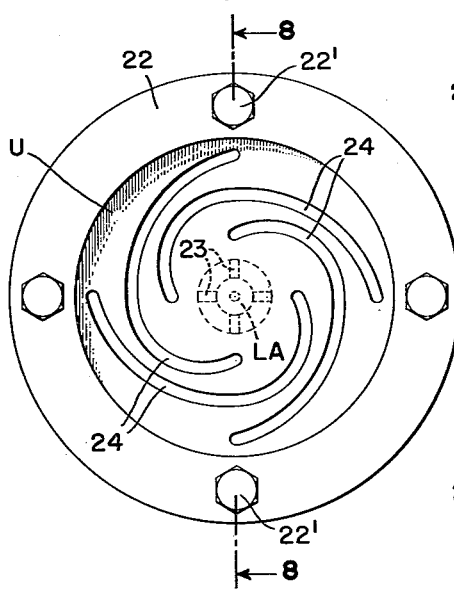
Figure 8:
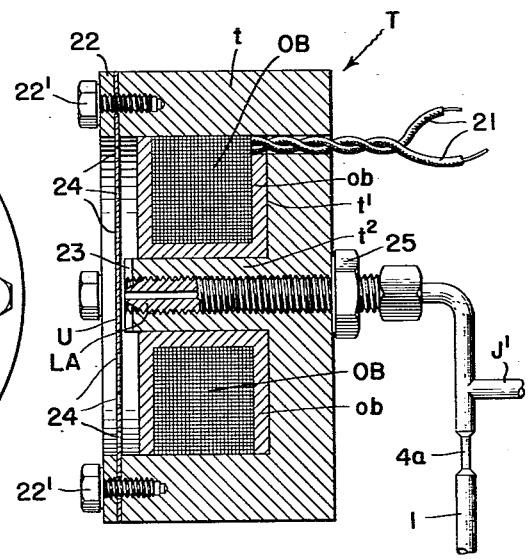
Figure 9:
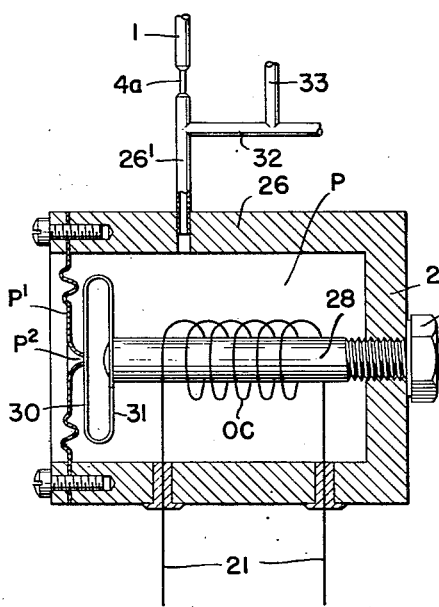
Figure 10:
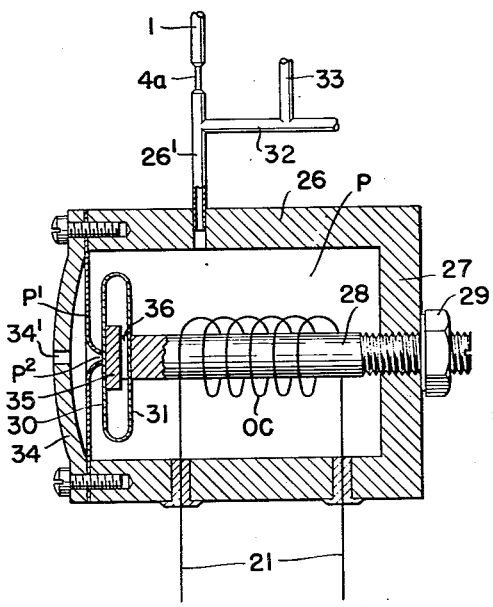
Figure 11:
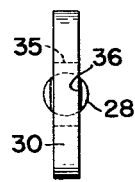

Figs. 5 and 6 each represent a different modification of the mechanism shown in Fig. 4 for obtaining space balance action;

Fig. 7 is a front elevation, and Fig. 8 is a transverse section, of a modification of the electro-magnetic means for regulating the air pressure shown in Fig. 1;

Fig. 9 illustrates a modification of the electro-magnetic means shown in Fig. 1 in which air pressure is regulated by the magnetic spacing of flexible metallic parts;

Fig. 10 represents a modification in respect to the construction of one of the magnetic parts; and Fig. 11 is an end view of a pole piece and flexible metallic part shown in Fig. 10.

The desirable embodiment of the invention diagrammatically illustrated by way of example in Fig. 1, includes a sensitive deflecting instrument A, shown as a galvanometer, or millivolt meter, which may be of a commercially available type. The galvanometer A, shown in Fig. 1, is of the conventional type comprising a deflecting element including a coil B, a pointer C, a vane D, and a spring E biasing the deflecting element to its zero position along the instrument scale A'. Conductors F are arranged to connect the flexible terminals of the coil B to a source of a small voltage, shown diagrammatically as a thermocouple TC. The vane D is shown as connected to the counter-poised end of the pointer C, and normally has a portion adjacent one side edge D' extending into the slot G' of a slotted inductor element G. The latter comprises two side-by-side pancake coils $g$ embedded in insulating material such as Bakelite, forming the side walls of the slot G'. Normally, the side edge D' of the vane D is adjacent a plane $g'$ transverse to and intersecting each of the coils $g$, as seen in Fig. 1A, so that a slight angular movement of the coil D about the galvanometer axis of oscillation in one direction or the other, will move the vane edge D' toward or away from the plane $g'$ and thereby gradually decrease or increase the mutual inductance of the coils $g$.

As variations in the temperature of the thermocouple TC cause the vane D to turn about its axis of oscillation, the element G is similarly turned about said axis. As shown, the element G is connected to and supported by one end of an arm H having its other end journalled on a pivot H' coaxial with the axis of oscillation of the coil B. The arm H and element G are angularly adjusted about said axis by and in accordance with variations in the fluid pressure transmitted to a suitable pressure responsive element which might be a bellows element but as shown, is a Bourdon tube I in the form of a helix or a flat spiral coiled about the oscillation axis of the galvanometer. One end, I', of the tube I is stationary and is connected by a conduit to a pipe portion J' of the air control apparatus J. As shown, the Bourdon tube I has its outer end closed, and is mechanically connected to the element G, and is so formed and arranged that an increase or decrease in the fluid pressure in the Bourdon tube turns the element G counter-clockwise, or clockwise respectively, as seen in Fig. 1.

The air control apparatus J shown in Fig. 1 is arranged to receive relatively clean air under a predetermined and approximately constant pressure from a supply pipe 1. The latter is connected through a branch pipe 2, a filter 3, and a regulable restriction 4 to the piping J', and through the latter, to the control pressure chamber 5 of a non-bleed type pilot valve or relay device K and to the Bourdon tube I, and to a bleed nozzle L. The pressure in the nozzle L and thereby in the chamber 5 and in the Bourdon tube is regulated by variably throttling the outlet orifice or bore of the bleed nozzle L, by a throttling device, shown as a flapper valve M. The latter is biased by a spring 7 to turn clockwise about a pivot 8 toward the discharge end of the nozzle L, but the position of the valve M relative to the discharge end of the nozzle L is controlled by the pressures in the Bourdon tube.

The pilot valve or relay device K shown, is of the well-known and widely used type disclosed and claimed in the Moore Patent 2,303,891 of December 1, 1942. It comprises inner and outer bellows walls 9 and 10, respectively, which have their lower ends anchored to the casing of the device K, and have their upper ends connected to a common movable end wall 11. The latter has a relatively large upperside area subject to the pressure in the chamber 5, and a relatively small underside area exposed to the pressure in the chamber 12. The chamber 12 includes an upper portion surrounded by the wall 9, and a lower portion of greater horizontal cross section than the upper portion and in which a valve 13 is mounted. The pressure in the chamber 12 is directly controlled by the valve 13, and the latter is automatically actuated on an increase or decrease in the pressure in the chamber 5 to increase or decrease the pressure in the chamber 12 as required to inversely proportion the respective pressures in the chambers 5 and 12 to the areas of the top wall 11, respectively exposed to the pressures in said chambers.

The valve 13 is spring biased for movement into an upper position in which it closes the lower end of a port 14 connecting the chamber 12 to the supply pipe 1. Secured to the movable upper end wall 11 is a depending tube 15 which engages and depresses or opens the valve 13 when the pressure in the chamber 12 is lower relative to the pressure in the chamber 5 than is desired. When the valve 13 is thus open, air flows into the chamber 12 through the port 14. As the pressure in the chamber 12 is thus suitably increased, the wall 11 moves upward and permits the valve 13 to close. When the pressure in the chamber 5 diminishes and the wall 11 moves upward above its normal position, the tube 15 is moved upward out of engagement with the valve 13. When this occurs, air escapes from the chamber 12 to the atmosphere through the tube 15 and through the space 16 between the bellows walls 9 and 10, that space being in communication at its upper end with the bore of the tube 15, and being open to the atmosphere at its lower end. The device K thus normally maintains a pressure in the chamber 12 which is in a constant proportion or ratio to the regulated pressure in the chamber 5.

The control pressure is transmitted from the chamber 12 through a pipe 17 to the device to be controlled by that pressure. As diagrammatically shown in Fig. 1, the controlled device is a diaphragm motor valve 18 in a pipe line 19. The latter may be employed, for example, to supply fuel to a furnace chamber to maintain an approximately constant temperature therein, which is measured by the thermocouple TC.

As diagrammatically shown, the mechanism through which pressure in the bleed nozzle L is made proportional to the varying value of the quantity measured by the instrument A, comprises electronic oscillator and amplifying means N. The latter are connected in a circuit network including the inductor coils g, conductors 20 arranged to connect the network to an energizing source of alternating current, and a solenoid winding O having its terminal 21 connected into the circuit network. A soft iron armature M' extends into one end of the solenoid O, and operatively connects the latter to the flapper valve M to which the soft iron armature M' may be welded. For the purposes of the present invention, the oscillator is adapted to vary its oscillatory state or condition progressively as the vane D moves toward and away from the central plane g' through a small range, which in some cases, may be as great as ten percent of the movement of the vane D for full scale deflection of the pointer B.

For the purposes of the present invention, the oscillator N is advantageously arranged to vary its oscillatory state or condition as the vane moves through a small range toward and away from the plane g'. The oscillator circuit network employed is preferably of the type and character disclosed and claimed in the Wannamaker application Serial No. 694,401, filed August 31, 1946, now Patent 2,564,937 and more generically claimed in the Mouzon application, Serial No. 18,817, filed April 3, 1948, now Patent No. 2,642,530, as a continuation of an earlier application, Serial No. 694,399, filed August 31, 1946, now abandoned, and further explanations concerning said network seem unnecessary herein.

In the normal operation of the apparatus shown in Fig. 1, the galvanometer pointer C will deflect along the galvanometer scale B' in accordance with the varying temperature of the thermocouple TC in the clockwise or counter-clockwise direction accordingly as said temperature increases or decreases. As the pointer deflects in one direction or the other, the vane D moves toward or away from the plane g' intersecting the inductance coils g. The resultant variation in the current flow in the solenoid O acts electro-magnetically through the part M' on the valve M and thereby varies the bleed nozzle pressure transmitted to the Bourdon tube I in the direction necessary to cause the inductance element G to follow the deflective movements of the vane D.

In any steady operating condition of the apparatus shown in Fig. 1, the pointer C and vane D are in positions along their respective deflection paths, depending on the value of the thermocouple voltage, and the inductor G will be in a predeterminable position relative to the vane. When, thereafter, a change in the thermocouple voltage occurs, various effects are produced. Thus, for example, on a decrease in the thermocouple temperature, the following effects are produced:

1. The pointer C turns counter-clockwise and the vane D moves counter-clockwise away from the central inductor plane g';
2. The resultant decrease in the mutual inductance of the coils g thereby increases the oscillation of the oscillator N and decreases the current in the solenoid O;
3. That current decrease causes the flapper valve M to move under the actuation of spring 7 toward the bleed nozzle L and thereby increases the regulated air pressure in the pipe J', Bourdon tube I and chamber 5;
4. The increase in the regulated pressure transmitted to the Bourdon tube I moves the inductor G counter-clockwise, following up the movement of vane D and thus diminishes the oscillation of the oscillator N', and
5. The increase in the regulated air pressure operating through the relay device K gives an opening adjustment to the diaphragm valve 18, and thereby tends to restore the temperature of the thermocouple TC to its normal value.

As perviously explained, the apparatus is preferably so constructed and arranged as to have a throttling range which may in some cases be as great as 10 percent of the total deflection range of the pointer C. With such a throttling range, the flapper valve M will normally tend to occupy an intermediate position relative to the bleed nozzle L which will be predetermined by "set-point" value adjustment. That value is fixed or predetermined by the calibration of the apparatus. When the thermocouple temperature decreases below its normal, or "set-point" value, the flapper valve M will move away from its intermediate position toward the nozzle L and thereby increase the air pressure in the bleed nozzle and increase the flow of fuel passing through the diaphragm valve until the latter is wide open. Thereafter, the diaphragm valve will remain open regardless of the thermocouple temperature so long as that temperature remains equal to or above the temperature at which it causes the diaphragm valve to move into its wide-open position.

Conversely, when following a steady operation period in which the thermocouple temperature is at its "set-point" value, the thermocouple temperature increases, effects are produced which are the reverse of those produced as described above, when said temperature falls below normal.

The apparatus shown diagrammatically in Fig. 1, is highly sensitive and dependable. A movement of the vane edge D' toward or away from its mid position relative to the plane g' through a distance of about 0.002 inch is sufficient to give the device G its desired follow-up adjustment.

In the electro-magnetic means modification illustrated in Fig. 2, the pressure in the bleed nozzle L is regulated by means comprising a solenoid winding OA surrounding a flexible flapper valve MA comprising a body of soft iron attached to and supported by the upper end portion of a flexible metallic reed MA'. The flat sides of the reed MA' are transverse to the nozzle L, and the lower end of the reed is attached to a stationary support. In Fig. 2, the upper end of armature-valve MA is adjacent to and between the poles N and S of a horse-shoe type permanent magnet P. The latter, as shown, is in the form of an arc extending circularly about an axis above and transverse to the axis of the associated nozzle L. In consequence, the armature-valve MA is subjected to a deflecting force created by current flow in the solenoid winding OA which surrounds the armature-valve MA. That current flow creates a magnetic attractive force acting between the upper end of the armature MA and one or the other of the two poles N, S of the magnet P, depending upon the direction of the unidirectional current flow through the winding OA. The winding OA may be energized by means similar to the means used to energize the winding of Fig. 1.

In the use of apparatus of the type shown in Fig. 2, the polarity of the current flowing through the solenoid winding OA may be that required to deflect the armature-valve MA toward or away from the nozzle L, so as to increase or decrease the pressure in the nozzle in response to the current flowing through the solenoid OA. In either case, the apparatus may operate to vary the rate of flow through the bleed nozzle L in linear proportion to variations in the current flowing through the coil OA. For any increment or decrement of current flow through the coil OA, the armature MA will move into a corresponding position in which it will be maintained in perfect static balance. No position restoring spring is utilized in moving the armature toward or away from the nozzle L. The thin metal reed MA' serves to anchor the lower end of the vane against the strong pull on the armature MA due to the magnet P. The normal or neutral position assumed by the armature should be mid-way between the poles N and S. Inasmuch as the temperature and aging of the magnet P affect both poles similarly, they introduce no zero shift in the calibrated device. The amount of flux reaction between the armature MA and the poles of the permanent magnet P determines the extent of deflection of the armature. The electro-pneumatic valve actuator shown in Fig. 2, may be readily constructed to have the degree of accuracy and the stability characteristics of a calibrated meter movement.

The modification shown in Fig. 3, differs from that shown in Fig. 2 in that the coil OA of Fig. 2 does not surround the armature-valve MA of Fig. 3, but does surround a soft iron core Q which extends diametrically between one end position in proximity to one pole of the magnet P and a second end position relatively remote from the second pole of the magnet P. Operatively the arrangement shown in Fig. 3 differs from that shown in Fig. 2, in that the neutral position which is normally midway between the poles N and S of the permanent magnet P, is made to shift when current flows through the winding OA. This shift is produced by a weakening or strengthening of the permanent north and south magnet poles N and S effected by the subtraction from and addition to said poles of flux set up in the soft iron core Q by the current flowing in the winding OA. Thus, in Fig. 2, the armature MA is deflected from a permanent neutral position by flux interaction with its field, whereas in Fig. 3, the soft iron armature MA follows a shifting neutral set up within the permanent magnet poles N and S.

Each of Figs. 4, 5 and 6 illustrate a modification of the electro-magnetic means for controlling the bleed nozzle pressure which differs specifically from the modifications illustrated in each of the other two figures, but the three modifications are alike in that each produces a space balance action. In each of Figs. 4, 5 and 6, the bleed nozzle pressure increase or decrease resulting from an adjustment of the flapper, or throttling valve toward or away from the bleed nozzle, produces a proportional movement of the valve respectively away from or toward the nozzle. In each of Figs. 4, 5 and 6, an armature-valve MA surrounded by a solenoid winding like the winding OA of Fig. 2, is associated with a stationary magnet P as in Fig. 2. The armature-valve MA is carried by a flexible reed MA' anchored at its lower end to a support which is stationary in Figs. 5 and 6, but in Fig. 4 is mounted on an adjustable uprising beam-like element R.

The lower end of the beam R is pivotally connected to a subjacent stationary support by a pivot element $ma$ in the form of a short vertically disposed reed. The upper end of the beam R is connected to the movable end of a bellows element S located in a stationary shell S' into which the bleed nozzle air pressure is transmitted by a pipe $S^2$. A movement of the armature MA toward or away from the bleed nozzle L, produced by a change in the current flowing through the solenoid winding OA, results in an increase or decrease, respectively, in the pressure transmitted to the shell S, and in a corresponding movement of the upper end of the beam R in the direction to respectively move the armature nozzle MA away from or toward the nozzle L. The ultimate result of the described operation is a variation in the bleed nozzle pressure, which, when transmitted to a follower mechanism including a Bourdon tube like or analogous to the tube I of Fig. 1, results in the adjustment of the inductor element G required to restore the normal relation between the angular positions of that element and the vane D.

The arrangement shown in Fig. 5 differs essentially from that shown in Fig. 4, only in that the nozzle LA is longitudinally movable toward and away from the armature-valve MA and is connected by a rigid pipe SA to the movable end wall of a bellows SA. The bellows element SA is actuated through the pipe connection $SA^2$ to move the bleed nozzle LA bodily toward and away from the armature-valve MA where the armature-valve MA is moved by bellows element S and beam R respectively toward and away from the nozzle L in Fig. 4.

The arrangement shown in Fig. 6 comprises a soft iron armature valve MA having its lower end connected by a reed MA' to a fixed support and associated with a bleed nozzle L and a permanent magnet P as in Fig. 2. In Fig. 6, however, the bleed nozzle pressure is transmitted through a branch of the piping J' to the space within a bellows element SB. The latter has its left end stationary and has its other end movable toward and away from the permanent magnet P as the pressure transmitted to the bellows SB increases and decreases. The movable end of the bellows SB supports a coaxial soft iron armature SB', which approaches and recedes from the side of the magnet P as the pressure transmitted to the bellows SB is increased and decreased. The armature SB' thus produces a redistribution of the flux developed in the armature MA as a result of a variation in the current flow in the coil OA, and a resultant change in the regulated air pressure. The movement of the armature SB' resulting from a change in the regulated or bleed nozzle pressure, leaves that armature in a position in which it is held in static balance.

The arrangement shown in each of Figs. 4, 5 and 6 is adapted to have the operative degree of accuracy and stability found in a calibrated meter movement, and its space balance feature gives the pneumatic valve actuator super-sensitivity.

In Figs. 7 and 8, I have illustrated electro-magnetic means T, for converting increments of electric current into increments of air pressure. As shown in Figs. 7 and 8, the converter mechanism comprises an electromagnet having a core $t$ in the form of a cylindrical body of mumetal or other suitable magnetic material of high permeability. The core body $t$ is formed with an annular groove or recess $t'$ which extends into the body $t$ from one end of the latter and surround a central pole piece $t^2$. The annular groove $t'$ receives a coil OB wound on a bobbin $ob$ which surrounds the central pole piece $t^2$. A flexible diaphragm U extends across the groove or cavity $t'$ and the central pole piece $t^2$ and has its peripheral portion clamped against the annular rim portion of the core $t$ surrounding the groove or recess $t'$. The diaphragm U is secured in place by an annular clamping ring 22 bearing against the outer surface of the peripheral portion of the diaphragm U, and removably secured to the rim of the core body $t$ by clamping screws 22'.

The central polar portion $t^2$ of the core $t$ is somewhat shorter than the rim portion of the core $t$. In consequence, the central portion of the diaphragm U is free to vibrate toward and away from the central pole piece $t^2$. That latter is formed with an axial passage which is internally threaded to receive the externally threaded portion of a bleed nozzle LA having its discharge end at a small but adjustable distance from the diaphragm U. While the distance of the central portion of the diaphragm from the discharge end of the bleed nozzle varies as a result of diaphragm vibration, the maximum value of that distance in practical operation is quite small and may well be not more than a few thousandths of an inch.

The terminals 21 of the coil OB may be connected to an oscillator similar to the oscillator N of Fig. 1, and in such case the pipe J' may be connected to a Bourdon tube associated with a measuring instrument as the Bourdon tube I is associated with the instrument A of Fig. 1. The pipe J' may also be connected to the regulated pressure chamber of a pilot valve or relay device, like the device K of Fig. 1, which is employed to adjust a diaphragm valve 18, and thereby regulate a fluid flow through a fuel pipe 19.

By using mumetal or similar material in the components of the magnetic circuit, magnetic hysteresis is reduced to such a low value that no change in calibration is needed when the polarity of the current flow through the coil OB is reversed. When the diaphragm is not in vibration, the central pole piece $t'$ extends to within about 0.005 inch from the adjacent face of the diaphragm U. Radial slots 23 in the end of the pole piece $t'$ are provided to permit a free escape of air from the nozzle. The lock nut 25 at the rear side of the magnetic body $t$ forms a means for clamping the nozzle LA to the core body in any desired axial adjustment.

In operation, the maximum air pressure acting on the diaphragm to force the latter away from the nozzle tip may be of the order of 5 lbs. per square inch. Current flowing through the winding OB sets up flux lines which attract the diaphragm U towards the tip of the bleed nozzle LA, and when that current is reduced to zero, the air pressure acting against the diaphragm may fall to a value as low as one-half pound. The flux lines set up by the current flowing through the winding OB moves the diaphragm D toward the tip of the nozzle LA until the magnetic pull on the diaphragm is balanced by the counter force developed by the air pressure. When the state of balance is approached, the diaphragm vibrates somewhat near its maximum mechanical period at the lower end of the pressure span, and the vibration period decreases at the upper end of the span.

The change in frequency is believed to be a function of the magnetic coupling. A loose coupling with a minimum number of flux lines subjects the diaphragm to minimum stress, while a close coupling with maximum flux lines produces a maximum stress.

As shown, curved channels 24 form extensions of the radial slots 23. The channels 24 may be in the form of grooves in the inner surface of the diaphragm in which case they increase the diaphragm flexibility. Alternately, the channels 24 may be formed by the space between adjacent curved ribs extending from the periphery of the central pole piece $t$ to the rim portion of the magnetic body $t$.

The apparatus shown in Figs. 7 and 8 has been found to be extremely sensitive when in a state of oscillation.

It is believed possible that the device could be operated by alternating current at a comparable frequency to produce the same effects as are obtained when operated by direct current.

In the modification shown in Fig. 9, the air supply pipe 1 is connected through a flow restriction 4a to one end of a pipe 26' having its other end connected to a chamber P which has its walls formed of magnetic material. As shown, the chamber P is surrounded by a cylindrical wall 26 and has one wall 27, and has its second end wall formed by a thin flexible diaphragm P'. The walls 26 and 27 are relatively thick, integrally connected parts. The diaphragm P' is formed with a small central protrusion extending into the chamber P and formed at its tip with an aperture or bleed orifice P². Axially disposed in the chamber P is a pole piece 28. As shown, one end of the part 28 is externally threaded and is in the threaded engagement with a central internally threaded opening in the end wall 27, and is anchored in place by an external lock nut 29, which, when tightened, prevents leakage through the joint between the part 28 and the end wall 27.

The end of the pole piece 28 adjacent the diaphragm P' supports a flexible sheet metal part which comprises a body portion or vane 30 spaced away from the pole piece and parallel and closely adjacent to the diaphragm P', and also comprises integral re-curved arm portions 31 which have their tips welded or otherwise attached to the adjacent end of the pole piece 28. The pole piece 28 is surrounded by a winding OC, which may be similar to the solenoid winding O of Fig. 1, and may be energized by means including an electronic oscillator and similar to the energizing means for the solenoid O of Fig. 1. As diagrammatically shown, the pipe 26' has a branch 32 for connection to the regulated pressure chamber 5, of a pilot valve or relay device which may be exactly like the device K shown in Fig. 1. The pipe 26' has a second branch 33 through which the regulated air pressure may be transmitted to a Bourdon tube similar in form and purpose to the tube I of Fig. 1.

With current flowing through the winding OC, the flexible vane part 30 is drawn by magnetic force action toward the diaphragm P'. As the vane 30 approaches the diaphragm P', the outflow of air through the orifice P² diminishes and the pressure in the chamber P increases, equilibrium being established when the pressure in the chamber P acting on the diaphragm P' moves the bleed orifice portion of the diaphragm into a hovering position. As those skilled in the art will understand, the maximum required relative movement of the flexible vane 30 and the inner end of the central protrusion of the diaphragm P', as the instrument A deflects through its full scale range, may be of the order of 0.004 inch, and will be in substantially linear ratio to the variation in the regulated air pressure within the chamber P and hence in the associated pilot valve chamber 5. With the small relative movement of the diaphragm P and part 30 thus required, the distance between the orifice P² and the vane 30 under all operating conditions, is such as to insure the desired linear relation between the pressure in the chamber P and the deflective position of the measuring pointer A.

The part 30 with its end portions 31 are advantageously

9 formed of the highly permeable magnetic material known as Mumetal and the portions of the magnetic circuit formed by the chamber walls 26 and 27 and by the pole piece 28 may well be formed of the same material. By releasing the lock nut 29 and rotating the pole piece 28, appropriate zero setting of the parts shown in Fig. 9 may be provided. The effective range of the apparatus may be varied by subjecting the diaphragm to an adjustable spring bias force tending to move the diaphragm toward the vane 30, or by otherwise regulating the magnetic force required to produce the desired relative movements of the parts H and I.

The modification shown in Figs. 10 and 11 differs essentially from that shown in Fig. 9, only by the addition and disposition of parts 34 and 35. The part 34 is a concave-convex disc of magnetic material at the outer side of the diaphragm P' and having its peripheral portion secured to the free end of the cylindrical wall part 26. The part 34 has its concave side adjacent the diaphragm P' and is formed with the central orifice 34' substantially larger in cross section than the orifice P². An oblong block 35 of Mumetal or other highly permeable magnetic material and much thicker than the diaphragm P' is loosely received in a slot 36 formed in the end of a pole piece 28 adjacent the diaphragm P'. The latter is interposed between the member 35 and the part 34. When current flows through the coil OC of Fig. 10, the part 35 is subjected to a relatively strong magnetic force moving it and the diaphragm P' towards the part 34. As collectively shown in Figs. 9 and 10, the length of the part 35 is greater than the diameter of the pole piece 28 while the width of the part is less than said diameter.

The use of the Mumetal block 35 permits the application to the diaphragm P' of a deflective force much larger than can be obtained by the magnetic interaction of the thin vane 30 and thin diaphragm P' of Fig. 9. Since the magnetic properties of the vane 30 are unimportant in the arrangement shown in Fig. 10, the vane 30 of that Fig. 9 may be well made of beryllium-copper. In the arrangement shown in Figs. 10 and 11, the vane 30 restricts the flow of air through the exhaust port P² in the diaphragm P' and thus permits the air pressure to build up in the air chamber P so that the diaphragm P' is deflected toward the plate 35 until a static balance condition is established and the vane 30 and diaphragm P' are in a hovering relation.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In air control apparatus for a pneumatic controlled member, the combination with structure enclosing an air space, a restrictive inlet through which air under pressure passes into said space and a bleed orifice for the regulated discharge of air from said space, means for varying the air pressure in said space in accordance with variations of a control condition comprising an electromagnetic mechanism for variably throttling said orifice, electrical means adjusted by variations in said control condition operating to impress an energizing electric current on said mechanism gradually varying in predetermined accordance with a variation in said condition and actuating said mechanism to subject said orifice to an increased or decreased throttling effect depending on the character of said condition, said electrical means comprising inductor means including two relatively moveable elements adjustable relative to one another in one direction to increase, and in the opposite direction to decrease the inductance of said inductor, means responsive to a change in the control condition for moving one of said elements in a direction dependent upon the direction of said change, and means independent of said control member directly actuated by the resultant change in the air space pressure to effect a follower adjustment of the second element, said elements being angularly movable about an axis, said last mentioned means comprising a Bourdon tube coiled about said axis.

2. Air control apparatus for regulating pneumatically actuated control member comprising in combination, a measuring instrument including an element arranged to deflect on and in accordance with variations in a quantity measured, a metallic vane connected to and deflecting with said element, an inductor mounted for movement toward and away from said element and including a first winding having an inductance which varies with changes in the relative positions of said vane and inductor, a circuit network including said first winding, a second winding and an electronic oscillator arranged to vary its oscillation condition in response to variations in the inductance of said inductor and thereby gradually vary the current flowing in said second winding, said apparatus including an air space, a restricted channel connecting said air space to a source of air under pressure and a bleed nozzle connected to said air space and having a discharge orifice, means actuated by said second winding to variably throttle said orifice and thereby regulate the air pressure in said space, and means independent of said control member directly actuated by the regulated air pressure to move said inductor toward said element following each deflecting movement of the latter away from said inductor.

3. Air control apparatus for regulating a pneumatically actuated control member comprising in combination, a measuring instrument including a part arranged to deflect about an axis in response to variations in the quantity measured, a metallic vane connected to and deflecting with said part, an inductor mounted to turn about said axis and including a winding having an inductance which is varied by changes in the relative positions of said vane and inductor, a circuit network including said first winding, a second winding, and an electronic oscillator having a normal oscillating condition but adapted to vary said condition as the inductance of said first winding is varied and thereby gradually vary the current flowing in said second winding, said apparatus comprising structure surrounding an air space and formed with a restricted channel for connecting said air space to a source of air under pressure, and formed with a bleed orifice for the outflow of air from said space, means actuated by said second winding when the current flow therein changes for variably throttling said orifice thereby regulating the air pressure in said space, and means independent of said control member directly actuated by said regulated pressure to give a follower adjustment to said inductor and thereby restore said normal condition following each deflecting movement of said vane.

4. Air control apparatus for regulating a pneumatically actuated control member comprising in combination, a measuring instrument including an element arranged to deflect about an axis in linear response to variations in the quantity measured, a metallic vane attached to said element, an inductive element mounted for rotation about its axis and formed with a slot into which said vane normally extends to an extent which varies with changes in the relative positions of said vane and element, said element comprising a separate coil at each side of said slot, a circuit network in which said coils are connected in series and including an electronic oscillator and a solenoid winding, structure surrounding an air space and formed with a restricted channel for connecting said air space to a source of air under pressure and formed with a bleed orifice for the outflow of air from said space, and means actuated by said solenoid for variably gradually throttling said orifice and thereby regulating the fluid pressure in said space, and means independent of said control member directly actuated by said regulated pressure to give a follower adjustment to said inductance element following each deflecting movement of the deflecting element.

References Cited in the file of this patent

UNITED STATES PATENTS

| | | |
|---|---|---|
| 1,675,919 | Babcock | July 3, 1928 |
| 1,887,322 | Nettleton | Nov. 8, 1932 |
| 2,020,847 | Mitereff | Nov. 12, 1935 |
| 2,054,464 | Johnson | Sept. 15, 1936 |
| 2,262,173 | Fischer | Nov. 11, 1941 |
| 2,294,694 | Ray | Sept. 1, 1942 |
| 2,310,298 | Kuhl et al. | Feb. 9, 1943 |
| 2,336,887 | Piron | Dec. 14, 1943 |
| 2,398,421 | Frische | Apr. 16, 1946 |
| 2,487,266 | Newell | Nov. 8, 1949 |
| 2,505,981 | McLeod | May 2, 1950 |
| 2,523,198 | Davies | Sept. 19, 1950 |
| 2,527,797 | Cohen | Oct. 31, 1950 |
| 2,538,618 | Fairchild | Jan. 16, 1951 |
| 2,576,611 | Lang et al. | Nov. 27, 1951 |
| 2,588,799 | Booth | Mar. 11, 1952 |
| 2,601,867 | Alyea | July 1, 1952 |

FOREIGN PATENTS

| | | |
|---|---|---|
| 27,345 | Sweden | Aug. 21, 1909 |
| 230,720 | Germany | Feb. 4, 1911 |